(12) United States Patent
Zhang et al.

(10) Patent No.: US 8,064,168 B1
(45) Date of Patent: Nov. 22, 2011

(54) HEAD STACK ASSEMBLY WITH FLEXURE TAIL RETENTION FEATURES

(75) Inventors: Yiduo Zhang, Cupertino, CA (US); Tzong-Shii Pan, San Jose, CA (US); Yih-Jen D. Chen, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1026 days.

(21) Appl. No.: 11/948,840

(22) Filed: Nov. 30, 2007

(51) Int. Cl.
*G11B 5/58* (2006.01)

(52) U.S. Cl. ............... 360/245.4; 360/245.8; 360/245.9; 360/265.9; 360/266

(58) Field of Classification Search ............... 360/245.4, 360/245.8, 245.9, 265.9, 266
See application file for complete search history.

(56) References Cited

U.S. PATENT DOCUMENTS

| | | | |
|---|---|---|---|
| 5,313,355 A * | 5/1994 | Hagen | 360/244.5 |
| 5,668,684 A | 9/1997 | Palmer et al. | |
| 5,691,861 A * | 11/1997 | Ohba | 360/245.8 |
| 5,781,380 A * | 7/1998 | Berding et al. | 360/264.2 |
| 5,805,377 A | 9/1998 | Lerdal et al. | |
| 5,991,123 A * | 11/1999 | Casey | 360/264.2 |
| 6,018,439 A | 1/2000 | Forbord et al. | |
| 6,046,886 A * | 4/2000 | Himes et al. | 360/245.9 |
| 6,154,344 A | 11/2000 | Marek | |
| 6,556,386 B1 * | 4/2003 | Endo | 360/264.2 |
| 6,754,045 B2 | 6/2004 | Korkowski et al. | |
| 6,847,506 B1 | 1/2005 | Lin et al. | |
| 6,940,698 B2 | 9/2005 | Lin et al. | |
| 7,059,868 B1 | 6/2006 | Yan | |
| 7,154,712 B2 | 12/2006 | Hayakawa et al. | |
| 7,159,347 B1 * | 1/2007 | Ngan | 40/514 |
| 2005/0190503 A1 * | 9/2005 | Maeda et al. | 360/245.9 |
| 2008/0019054 A1 * | 1/2008 | Hur | 360/264.2 |
| 2008/0062571 A1 * | 3/2008 | Toukairin et al. | 360/245.9 |

* cited by examiner

*Primary Examiner* — Jefferson Evans

(57) ABSTRACT

A novel head stack assembly (HSA), and method for HSA assembly, are disclosed and claimed. A first flexure tail has a long axis approximately parallel to a side of the actuator arm. The actuator arm includes a slot in the side having a slot end. The first flexure tail is disposed partially within the slot. The first flexure tail includes a first raised region in contact with the slot adjacent the slot end. The first raised region includes an out-of-plane bend with cross-sectional curvature along the long axis. The first raised region may be squeezed while inserting the first flexure tail partially within the side slot, with the first raised region adjacent the slot end, and then allowed to expand into contact with the slot adjacent the slot end.

7 Claims, 8 Drawing Sheets

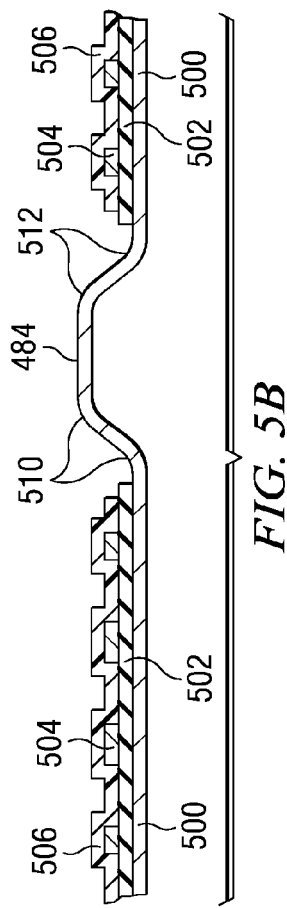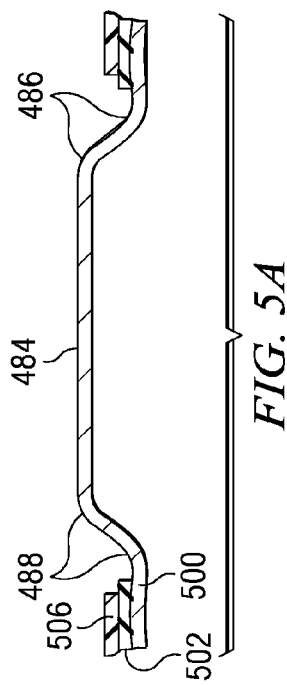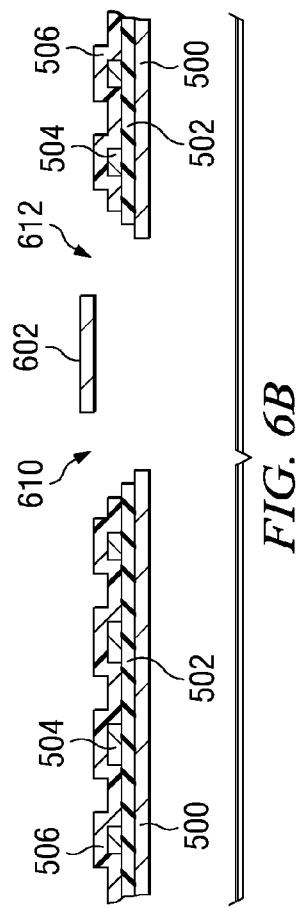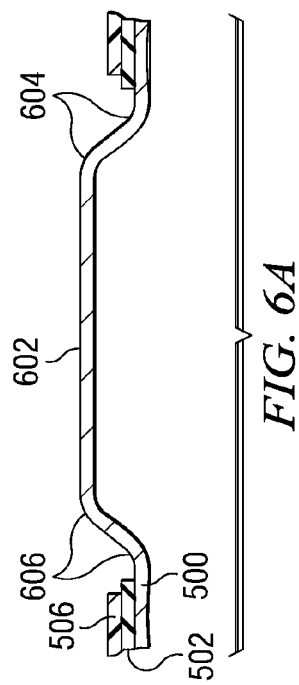

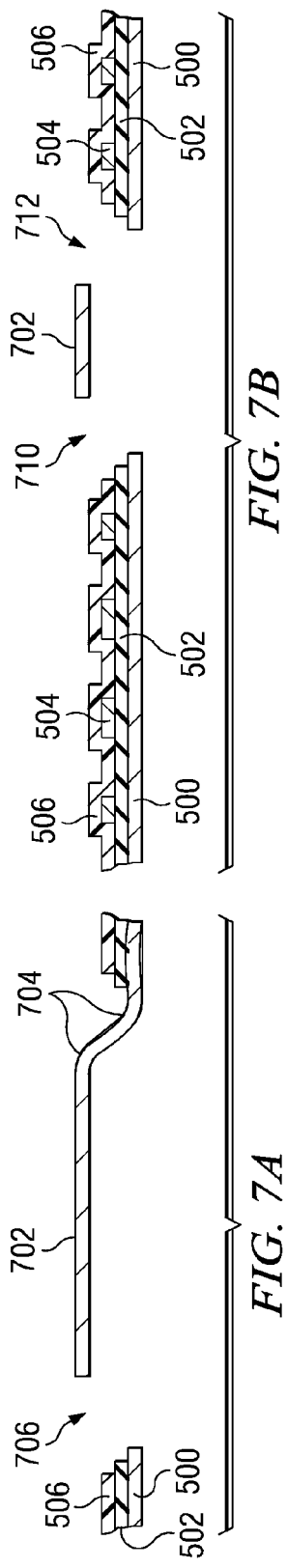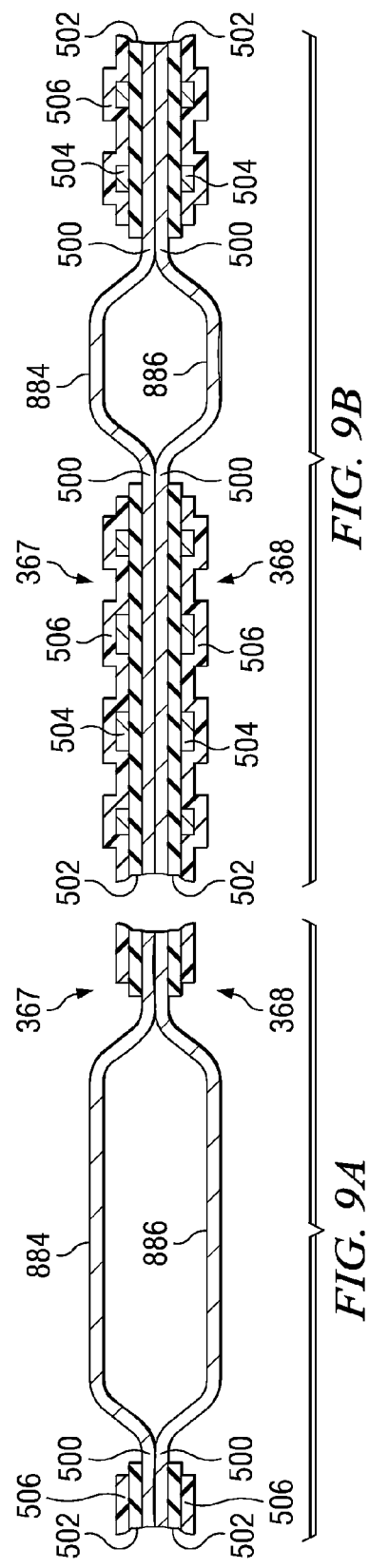

a load beam, and a head attached to the second laminated flexure. The second laminated flexure includes a second flexure tail attached to the flex cable. The second flexure tail has a long axis approximately parallel to a side of the actuator arm. The second flexure tail is disposed partially within the slot. The second flexure tail includes a second raised region in contact with the slot adjacent the slot end. The second raised region includes an out-of-plane bend with cross-sectional curvature along the long axis.

HEAD STACK ASSEMBLY WITH FLEXURE TAIL RETENTION FEATURES

BACKGROUND OF THE INVENTION

1. Field of the Invention

The present invention relates generally to the field of information storage devices, and more particularly to head stack assemblies used in such devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flex cable. The plurality of HGAs is attached to various arms of the actuator, and each of the laminated flexures of the HGAs has a flexure tail that is electrically connected to the HSA's flex cable.

Modern laminated flexures typically include conductive copper traces that are isolated from a stainless steel structural layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes traces that extend from adjacent the head and terminate at electrical connection points at the flexure tail. The flex cable includes electrical conduits that correspond to the electrical connection points of the flexure tail.

Each flexure tail is physically held adjacent a supporting actuator arm, typically by adhesive tacking. If the flexure tail is not adequately secured to the actuator arm, air induced by disk rotation can cause the flexure tail to excessively flutter. Excessive flutter is undesirable because it can lead to excessive vibration of adjacent components, causing dynamic disturbances that can induce read/write errors. Excessive flutter may also cause contact locations between the flexure tail and actuator arm to wear, thereby generating debris particles that can undesirably contaminate the head/disk interface. On the other hand, adhesive tacking is undesirable because it is both a risky and cumbersome manufacturing process in a high-volume manufacturing environment. Disk drive components are typically assembled in clean rooms because small amounts of contamination can result in manufacturing yield loss due to interference with the operation of sensitive and high-precision components such as magnetic recording heads. Control of the spread of adhesive and its constitutive chemicals represents a formidable challenge in high volume disk drive manufacture, and therefore processes that require adhesive are not favored.

Accordingly, there is a need in the art for improved flexure tail and actuator arm configurations to facilitate securing the flexure tail(s) to corresponding actuator arms with reduced need for adhesive tacking.

SUMMARY

A novel head stack assembly (HSA), and method for HSA assembly, are disclosed and claimed. An actuator includes an actuator body and an actuator arm extending from the actuator body. A flex cable is attached to the actuator. A first head gimbal assembly (HGA) is attached to the actuator arm. The first HGA includes a load beam, a first laminated flexure attached to the load beam, and a head attached to the first laminated flexure. The first laminated flexure includes a first flexure tail attached to the flex cable. The first flexure tail has a long axis approximately parallel to a side of the actuator arm. The actuator arm includes a slot in the side having a slot end. The first flexure tail is disposed partially within the slot. The first flexure tail includes a first raised region in contact with the slot adjacent the slot end. The first raised region includes an out-of-plane bend with cross-sectional curvature along the long axis. The first raised region may be squeezed while inserting the first flexure tail partially within the side slot, with the first raised region adjacent the slot end, and then allowed to expand into contact with the slot adjacent the slot end.

BRIEF DESCRIPTION OF DRAWINGS

FIG. 5A depicts a local cross-section of a raised region of a flexure tail according to an embodiment of the present invention, the cross-section taken along the long axis of the flexure tail.

FIG. 5B depicts a local cross-section of a raised region of a flexure tail according to an embodiment of the present invention, the cross-section taken perpendicular to the long axis of the flexure tail.

FIG. 6A depicts a local cross-section of a raised region of a flexure tail according to an embodiment of the present invention, the cross-section taken along the long axis of the flexure tail.

FIG. 6B depicts a local cross-section of a raised region of a flexure tail according to an embodiment of the present invention, the cross-section taken perpendicular to the long axis of the flexure tail.

FIG. 7A depicts a local cross-section of a raised region of a flexure tail according to an embodiment of the present invention, the cross-section taken along the long axis of the flexure tail.

FIG. 7B depicts a local cross-section of a raised region of a flexure tail according to an embodiment of the present invention, the cross-section taken perpendicular to the long axis of the flexure tail.

FIG. 9A depicts a local cross-section of raised regions of two flexure tails according to an embodiment of the present invention, the cross-section taken along the long axis of the flexure tails.

FIG. 9B depicts a local cross-section of raised regions of two flexure tails according to an embodiment of the present invention, the cross-section taken perpendicular to the long axis of the flexure tails.

DETAILED DESCRIPTION OF EXEMPLARY EMBODIMENTS

Figure 1:
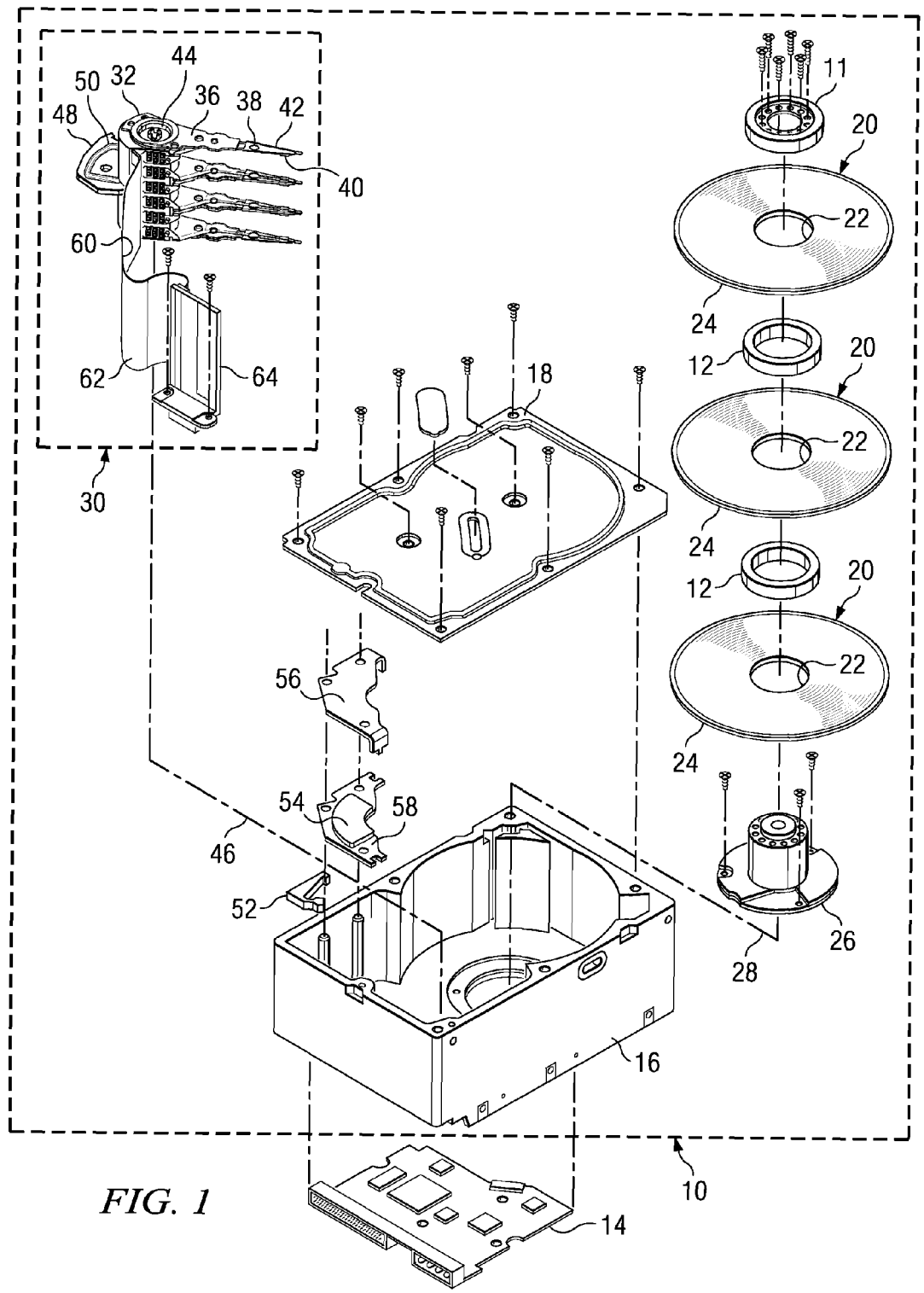
FIG. 1 is an exploded top perspective view of a disk drive including a head stack assembly according to an embodiment of the present invention.

FIG. 1 illustrates a disk drive according to an embodiment of the present invention. The disk drive includes a head disk assembly (HDA) 10 and a printed circuit board assembly (PCBA) 14. The base 16 and cover 18 of HDA 10 house at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all fixed to the hub by disk clamp 11.

The HDA 10 further includes a head stack assembly (HSA) 30 rotatably attached to the base 16 of HDA 10. The HSA 30 includes an actuator body 32 having a bore 44 and a pivot bearing cartridge engaged within the bore for facilitating the HSA 30 to rotate relative to HDA 10 about actuator pivot axis 46. One or more actuator arms 36 extend from the actuator body 32, and one or two head gimbal assemblies (HGA) 38 are attached to a distal end of each actuator arm 36. Each HGA 38 includes a head (e.g. head 40) for reading and writing data from and to the disk 20, and a load beam 42. The HSA 30 further includes a coil support 48 that extends from one side of the HSA 30 that is opposite head 40. The coil support 48 is configured to support a coil 50 through which a changing electrical current is passed. The coil 50 interacts with one or more magnets 54 that are attached to base 16 via a yoke structure 56, 58, to form a voice coil motor for controllably rotating the HSA 30. HDA 10 includes a latch 52 rotatably mounted on base 16 to prevent undesired rotations of HSA 30.

The printed circuit board assembly 14 includes a servo control system for generating servo control signals to control the current through the coil 50 and thereby position the head stack assembly 30 relative to tracks disposed upon surfaces of disk 20. The head stack assembly 30 is electrically connected to printed circuit board assembly (PCBA) 14 via a flex cable assembly 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 comprises a body called a "slider" that carries a magnetic transducer on its trailing end (not visible given the scale of FIG. 1). The magnetic transducer may include an inductive write element and a magnetoresistive read element. In the magnetic hard disk drive of FIG. 1, the transducer is separated from the magnetic disk during operation by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
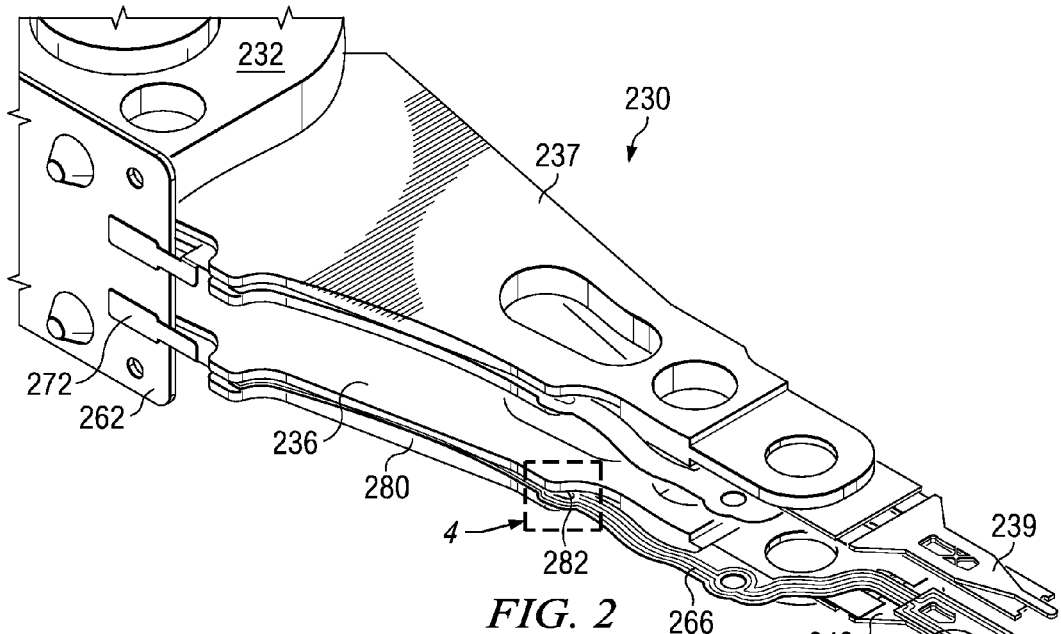
FIG. 2 depicts a head stack assembly according to an embodiment of the present invention.

Now referring to FIG. 2, the HSA 230 includes an actuator body 232 and two actuator arms 236 and 237 that extend from the actuator body 232. HGAs 238 and 239 are attached to each of the two actuator arms 236, 237, respectively. HGA 238 includes a load beam 242, a laminated flexure 234 attached to the load beam 242, and a head 240 attached to the laminated flexure 234. The purpose of the load beam 242 is to provide vertical compliance for the head 240 to follow vertical undulation of the surface of disk 20 as it rotates, and to preload the head 240 against the surface of disk 20 as it rotates, by a preload force that is commonly referred to as the "gram load." A first purpose of the flexure 234 is to provide compliance for the head 240 to follow pitch and roll angular undulations of the surface of disk 20 as it rotates, while restricting relative motion between the head 240 and the load beam 242 in the lateral direction and about a yaw axis. A second purpose of the flexure 234 is to provide a plurality of electrical paths to the head 240 to facilitate signal transmission to/from the head 240.

For that second purpose, the laminated flexure 240 includes electrically conductive traces that are isolated from a structural layer by a dielectric layer. For example, the conductive traces may comprise copper, the structural layer may comprise stainless steel, and the dielectric layer may comprise polyimide. Portions of the electrically conductive traces may also be coated with an insulative cover layer (e.g. a polymer layer). So that the signals from/to the head 240 can reach the flex cable 262 adjacent the actuator body 232, each HGA flexure 234 includes a flexure tail 266 that extends away from the head 240 along the actuator arm 236 and ultimately attaches to the flex cable 262 adjacent the actuator body 232. That is, the flexure 234 includes traces that extend from adjacent the head 240 and terminate at electrical connection points at a terminal region 272 of the flexure tail 266. As can be seen in FIG. 2, each flexure tail (e.g. flexure tail 266) is a distinct and smaller component, as compared with flex cable 262, and the flexure tail 266 has a long axis that is approximately parallel to a side of the actuator arm 236. To position the flexure tail 266 relative to the actuator arm 236, actuator arm 236 includes a slot 280 in its side and the flexure tail 266 is disposed partially within the slot 280. The slot 280 has a slot end 282 where a portion of the flexure tail 266 enters the slot. The traces on the flexure tail 266 are electrically connected to the flex cable 262, at terminal region 272 of the flexure tail 266. Methods of electrical connection of the flexure tail 266 to the flex cable 262 include ultrasonic tab bonding, solder reflow, and solder jet bond (SJB).

Figure 3:
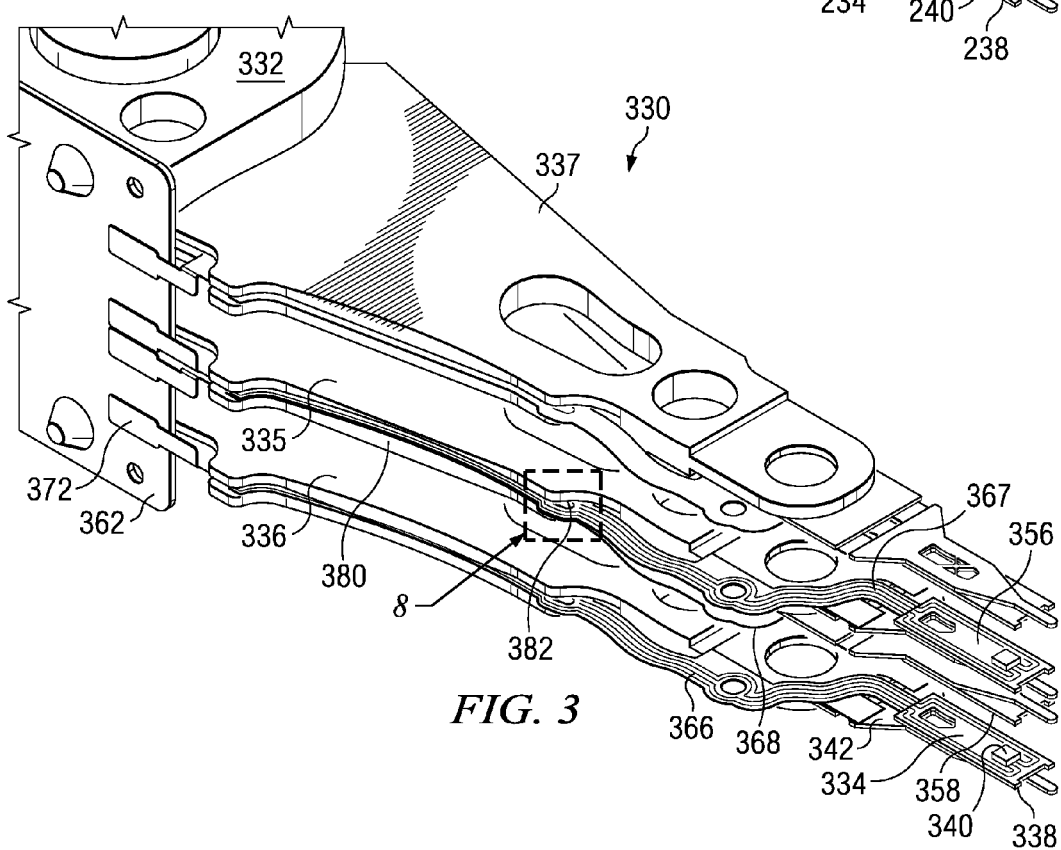
FIG. 3 depicts a head stack assembly according to an embodiment of the present invention.

Now referring to FIG. 3, the HSA 330 includes an actuator body 332 and three actuator arms 335, 336 and 337 that extend from the actuator body 332. HGA 338 is attached to actuator arm 336. HGA 338 includes a load beam 342, a laminated flexure 334 attached to the load beam 342, and a head 340 attached to the laminated flexure 334. So that the signals from/to the head 340 can reach the flex cable 362 adjacent the actuator body 332, each HGA flexure 334 includes a flexure tail 366 that extends away from the head 340 along the actuator arm 336 and ultimately attaches to the flex cable 362 adjacent the actuator body 332. That is, the flexure 334 includes traces that extend from adjacent the head 340 and terminate at electrical connection points at a terminal region 372 of the flexure tail 366. As can be seen in FIG. 3, each flexure tail (e.g. flexure tail 366) is a distinct and smaller component, as compared with flex cable 362, and the flexure tail 366 has a long axis that is approximately parallel to a side of the actuator arm 336. The traces on the flexure tail 366 are electrically connected to the flex cable 362, at terminal region 372 of the flexure tail 366. To position the flexure tail 367 relative to the actuator arm 335, actuator arm 335 includes a slot 380 in its side and the flexure tail 367 is disposed partially within the slot 380. The slot 380 has a slot end 382 where a portion of the flexure tail 367 enters the slot.

HGAs 356 and 358 are attached to actuator arm 335. Each of HGAs 356 and 358 include laminated flexures having flexure tails (flexure tails 367 and 368, respectively). Flexure tails 367 and 368 are disposed partially within the side slot 380, and are each attached to the flex cable 362.

Figure 4:
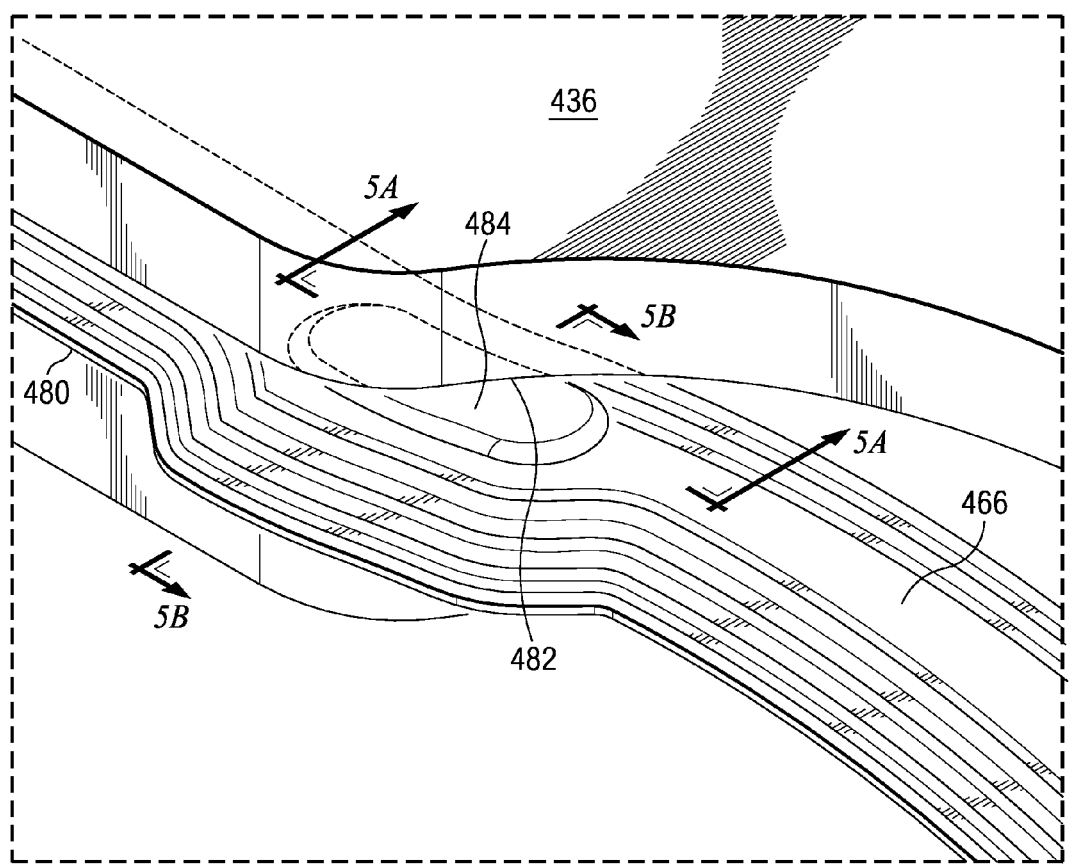
FIG. 4 depicts a close up view of a portion of a head stack assembly according to an embodiment of the present invention, indicating the location and direction of planes of cross-section used in FIGS. 5-7.

FIG. 4 depicts a close up view of a portion of an HSA (e.g. the close-up region indicated in FIG. 2 by a dashed box) according to an embodiment of the present invention. Now referring to FIG. 4, a flexure tail 466 includes a raised region 484 in contact with a slot 480 in an actuator arm 436. The contact between the raised region 484 and the slot 480 is adjacent an end 482 of the slot 480. The raised region 484 is disposed partially within the slot 482. Markings in FIG. 4 indicate the locations and orientations of cross-sections shown in FIGS. 5A and 5B.

FIG. 5A depicts a local cross-section of raised region 484, the cross-section taken along the long axis of the flexure tail 466. Now referring to FIGS. 4 and 5A, the raised region 484 includes out-of-plane bends 486 and out-of-plane bends 488, each having cross-sectional curvature along the long axis of a flexure tail 466 (i.e. curvature along the cross section 5A). The out-of-plane bends 486 shown in FIG. 5A are disposed within the slot 480, and the out-of-plane bends 488 shown in FIG. 5A are disposed outside the slot 480.

FIGS. 5A and 5B depict the layers of flexure tail 466, which correspond to the layers of the laminated flexure from which flexure tail 466 extends. As shown in FIGS. 5A and 5B, the laminated flexure tail 466 includes a stainless steel layer 500, a dielectric layer 502, a conductive layer 504, and an insulative cover layer 506. The conductive layer 504 is not present in the cross-section of FIG. 5A but portions of it are present in the cross-section of FIG. 5B. As can be seen in FIG. 5A, the stainless steel layer 500 is present in the raised region 484, but the dielectric layer 502, the conductive layer 504, and the insulative cover layer 506 are not.

FIG. 5B depicts a local cross-section of raised region 484, the cross-section taken perpendicular to the long axis of the flexure tail 466. Now referring to FIGS. 4 and 5B, the raised region 484 also includes out-of-plane bends 510 and out-of-plane bends 512, each having cross-sectional curvature along an axis that is perpendicular to the long axis of the flexure tail 466 (i.e. curvature along the cross section 5B). Considering the locations of the cross-sections shown in FIG. 4, the out-of-plane bends 512 shown in FIG. 5B are disposed within the slot 480, and the out-of-plane bends 510 shown in FIG. 5B are disposed outside the slot 480. In the embodiment of FIG. 5B, the height of the raised region 484 preferably exceeds the sum of the average thickness of the dielectric layer 502, the average thickness of the conductive layer 504, and the average thickness of the insulative cover layer 506, so that the raised region 484 can protrude above the cover layer 506 and contact a surface of the slot 480. In certain embodiments, retention of the raised region 484 in slot 480 is enhanced by preferably designing the HSA so that the height of the slot 480 is no greater than the sum of the height of the raised region 484 and the average thickness of the stainless steel layer 500.

FIG. 5B also depicts the layers of flexure tail 466, which correspond to the layers of the laminated flexure from which flexure tail 466 extends. The conductive layer 504 is depicted in the cross-section of FIG. 5B as comprising a plurality of conductive traces that are spaced apart from each other and are electrically isolated from each other and from the outside environment partly due to the insulative cover layer 506. As can be seen in FIG. 5B, the stainless steel layer 500 is present in the raised region 484, but the dielectric layer 502 and the conductive layer 504 are not.

FIG. 6A depicts a local cross-section taken along a flexure tail long axis (similar to that of FIG. 5A), including a raised region 602 according to another embodiment of the present invention. Now referring to FIG. 6A, the raised region 602 includes out-of-plane bends 604 and out-of-plane bends 606, each having cross-sectional curvature along the flexure tail long axis.

FIG. 6B also depicts a local cross-section of raised region 602 (similar to that of FIG. 5B), except with the cross-section taken perpendicular to the cross section of FIG. 6A. Now referring to FIG. 6B, through-etched openings 610 and 612 laterally separate the raised region 602 from the regions of the flexure tail that are laterally outboard from the raised region 602. Note that in the embodiment of FIG. 6B, each of the through-etched openings 610 and 612 creates a lateral separation completely through all layers of the corresponding laminated flexure tail, whereas in the embodiment of FIG. 5B the stainless steel layer 500 was continuous in these regions. The lateral separations caused by through-etched openings 610 and 612 may serve to increase the vertical compliance of the raised region 602 in the embodiment of FIG. 6B. They may also serve to reduce or eliminate the drawing-in of flexure tail material in the lateral direction during forming of the raised region 602, so that the flexure tail designer does not need to widen the flexure tail as much near the raised region 602. Such a design advantage may be used to increase the pattern density of flexures fabricated from a laminated sheet during manufacture. Alternatively, in an embodiment where pattern density is less important, the raised region may be hemispherical in shape with no through-etched openings.

FIG. 7A depicts a local cross-section taken along a flexure tail long axis (similar to that of FIG. 5A), including a raised region 702 according to another embodiment of the present invention. Now referring to FIG. 7A, the raised region 702 includes out-of-plane bends 704, each having cross-sectional curvature along the flexure tail long axis. Through-etched opening 706 longitudinally separates one end of the raised region 702 from the rest of the flexure tail. The longitudinal separation caused by through-etched opening 706 may serve to increase the vertical compliance of the raised region 702 in the embodiment of FIG. 7A. The longitudinal separation caused by through-etched opening 706 may also serve to reduce or eliminate the drawing-in of flexure tail material in the longitudinal direction during forming of the raised region 702, and thereby reduce excessive warping or excessive flexure tail length variation that may otherwise result from forming the raised region 702.

FIG. 7B also depicts a local cross-section of raised region 702 (similar to that of FIG. 5B), except with the cross-section taken perpendicular to the cross section of FIG. 7A. Now referring to FIG. 7B, through-etched openings 710 and 712 laterally separate the raised region 702 from the regions of the flexure tail that are laterally outboard from the raised region 702. Note that in the embodiment of FIG. 7B, each of the through-etched openings 710 and 712 creates a lateral separation completely through all layers of the corresponding laminated flexure tail, whereas in the embodiment of FIG. 5B the stainless steel layer 500 was continuous in these regions. The lateral separations caused by through-etched openings 710 and 712 may serve to increase the vertical compliance of the raised region 702 in the embodiment of FIG. 7B. They may also serve to reduce or eliminate the drawing-in of flexure tail material in the lateral direction during forming of the raised region 702, so that the flexure tail designer does not need to widen the flexure tail as much near the raised region 702. Such a design advantage may be used to increase the pattern density of flexures fabricated from a laminated sheet during manufacture.

Figure 8:
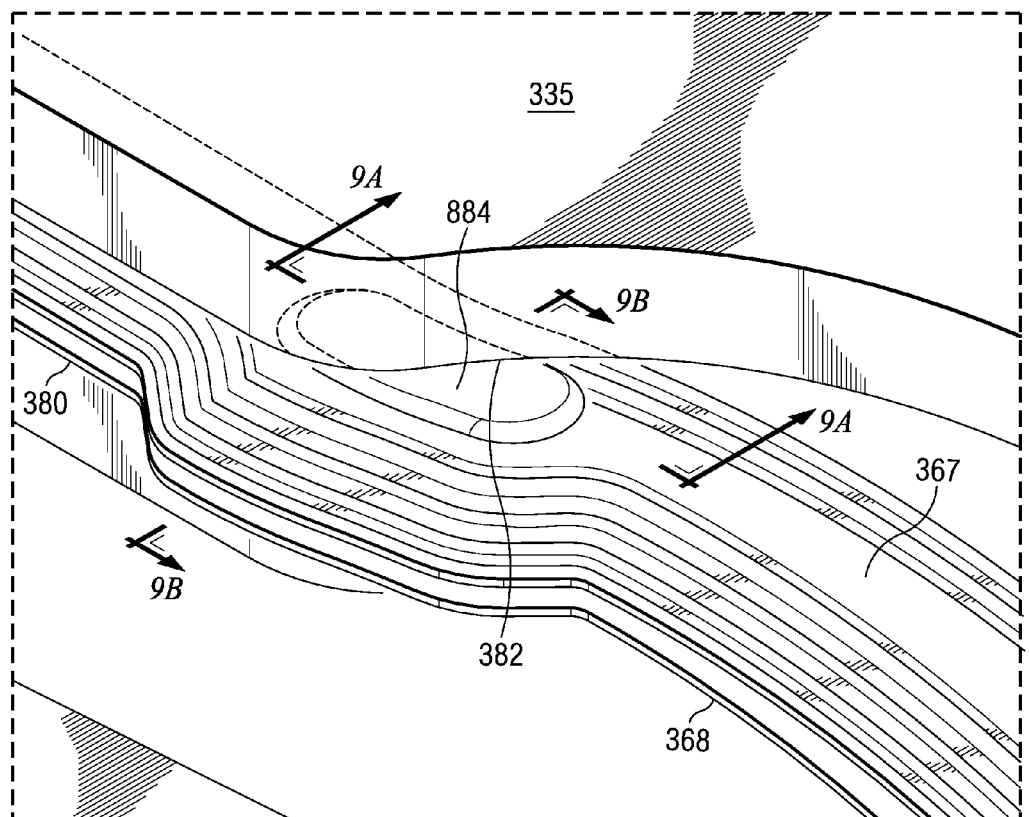
FIG. 8 depicts a close up view of a portion of a head stack assembly according to an embodiment of the present invention, indicating the location and direction of planes of cross-section used in FIGS. 9A and 9B.

Now referring to FIGS. 8, 9A, and 9B, flexure tails 367 and 368 include raised regions 884 and 886 that are each in contact with an opposing surface of the slot 380 adjacent the slot end 382. The stainless steel layer 500 of flexure tail 367 is in contact with the flexure tail 368 at a tail-to-tail contact location that lies outside the raised region 884, and the stainless steel layer 500 of the tail 367 (at a location within the raised region 884) is in contact with the slot 380 adjacent the slot end 382. The stainless steel layer 500 of the flexure tail 368 is in contact with the flexure tail 367 at a tail-to-tail contact location that lies outside the raised region 886, and the stainless steel layer 500 of the flexure tail 368 (at a location within the raised region 886) is in contact with the slot 380 adjacent the slot end 382. In certain embodiments, retention of the raised regions 884 and 886 in slot 380 is enhanced by preferably designing the HSA so that the height of the slot 380 is no greater than the sum of the height of the raised region 884, the height of raised region 886, the average thickness of the stainless steel layer 500 of flexure tail 367, and the average thickness of the stainless steel layer 500 of flexure tail 368. For example, in the embodiment of FIGS. 9A and 9B, retention of the raised regions 884 and 886 in slot 380 is enhanced by preferably designing the HSA so that the height of the slot 380 is no greater than the sum of twice the height of the raised region 884, and twice the average thickness of the stainless steel layer 500 of flexure tail 367.

Figure 10:
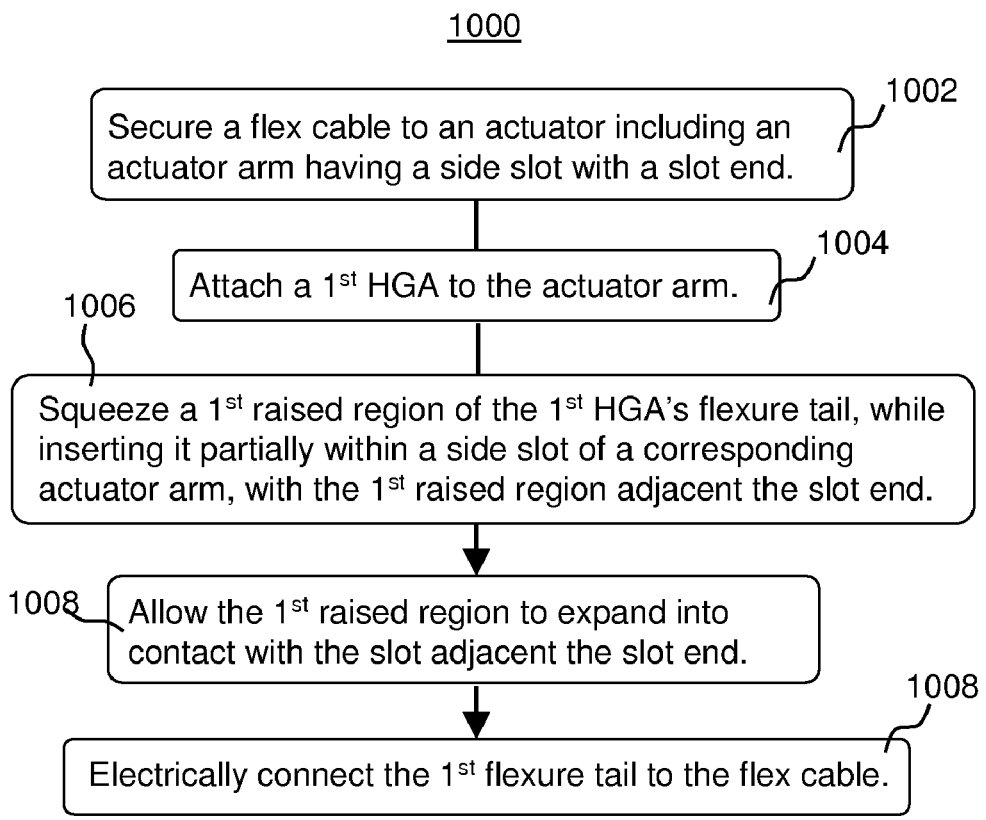
FIG. 10 depicts a method to assemble a head stack assembly, according to an embodiment of the present invention.

FIG. 10 depicts a method 1000 to assemble a HSA (e.g. HSA 30), according to an embodiment of the present invention. In step 1002, a flex cable (e.g. flex cable 62) is secured to an actuator (e.g. to actuator body 32) including an actuator arm (e.g. actuator arm 236) having a side slot (e.g. side slot 280) with a slot end (e.g. slot end 282). Adhesive may be used to secure the flex cable 62 in this step, perhaps in conjunction with alignment via alignment pins and mating holes. An HGA (e.g. HGA 238) is attached to the actuator arm (e.g. actuator arm 236) in step 1004. The HGA 238 may be attached to actuator arm 236 via conventional swaging methods.

In step 1006, a raised region (e.g. raised region 484) of the HGA's flexure tail (e.g. flexure tail 466) is squeezed while inserting the flexure tail (e.g. flexure tail 466) partially within the side slot (e.g. side slot 280) of the actuator arm (e.g. actuator arm 236), with the raised region (e.g. raised region 484) adjacent the slot end (e.g. slot end 282). Such squeezing may be accomplished manually by a human operator using a simple instrument such as tweezers, or else in an automated fashion by appropriate adaptation of automated fabrication systems (e.g. appropriate adaptation of contemporary vision-based automated fabrication tools that are used today to locate and adhere the head to the flexure). In step 1008, the raised region (e.g. raised region 602) is allowed to expand into contact with the side slot (e.g. side slot 280) adjacent the slot end (e.g. slot end 282). This can be accomplished, for example, by a simple release of the compressive force temporarily applied by the operator using tweezers. In step 1008, the flexure tail (e.g. flexure tail 466) is electrically connected to the flex cable (e.g. flex cable 62). Methods of electrical connection of the flexure tail to the flex cable may include ultrasonic tab bonding, solder reflow, and solder jet bond (SJB).

Figure 11:
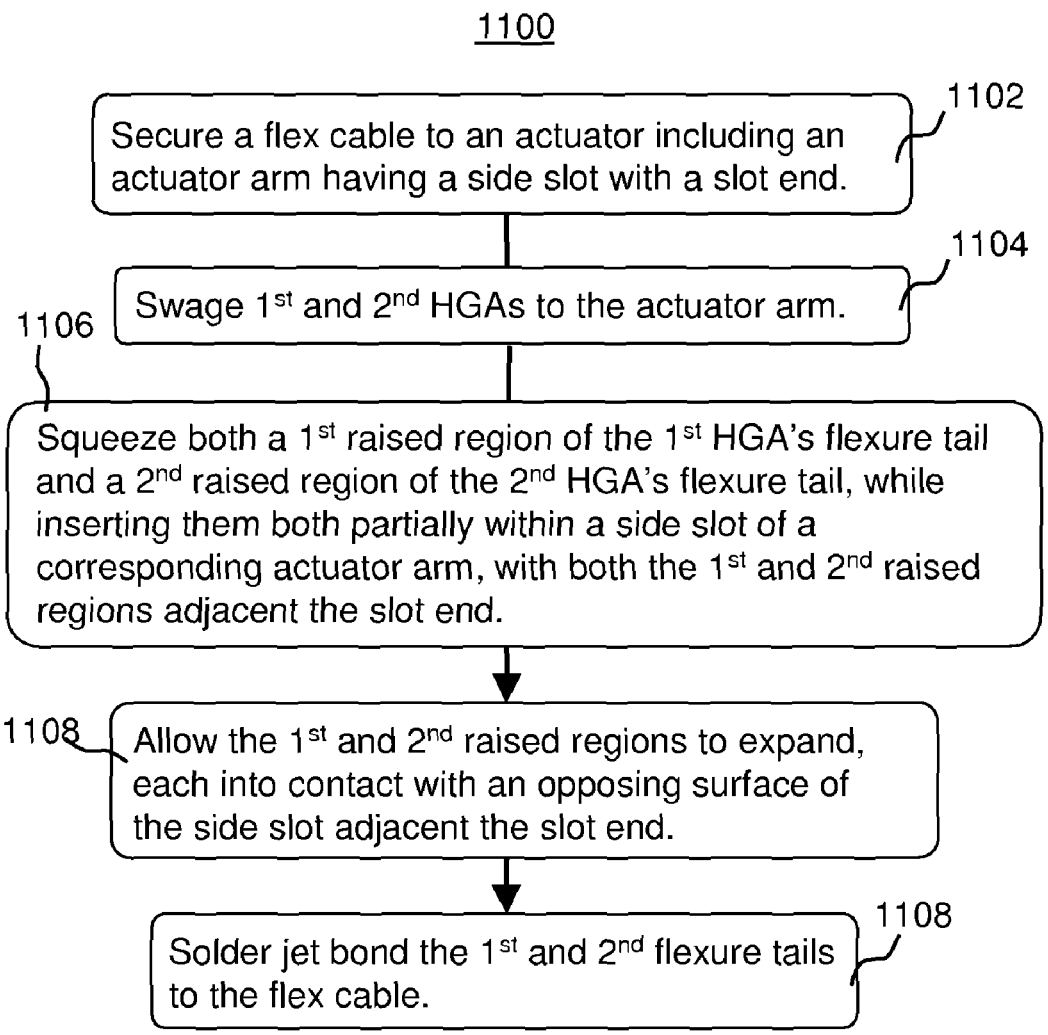
FIG. 11 depicts a method to assemble a head stack assembly, according to an embodiment of the present invention.

FIG. 11 depicts a method 1100 to assemble a HSA (e.g. HSA 30), according to an embodiment of the present invention. In step 1102, a flex cable (e.g. flex cable 62) is secured to an actuator (e.g. to actuator body 32) including an actuator arm (e.g. actuator arm 335) having a side slot (e.g. side slot 380) with a slot end (e.g. slot end 382). Adhesive may be used to secure the flex cable 62 in this step, perhaps in conjunction with alignment via alignment pins and mating holes. First and second HGAs (e.g. HGAs 356 and 358) are attached to the actuator arm (e.g. actuator arm 335) in step 1104. The HGAs 356 and 358 may be attached to actuator arm 335 via conventional swaging methods.

In step 1106, a first raised region (e.g. raised region 884) of the flexure tail 367 of the first HGA 356, and a second raised region (e.g. raised region 886) of the flexure tail 368 of the second HGA 358, are squeezed while inserting the flexure tails 367 and 368 partially within the side slot 380 of the actuator arm 335, with both the first and second raised regions (e.g. raised regions 884 and 886) adjacent the slot end (e.g. slot end 382). Such squeezing may be accomplished manually by a human operator using a simple instrument such as tweezers, or else in an automated fashion by appropriate adaptation of automated fabrication systems (e.g. appropriate adaptation of contemporary vision-based automated fabrication tools that are used today to locate and adhere the head to the flexure). In step 1108, the first and second raised regions (e.g. raised regions 884 and 886) are allowed to expand each into contact with an opposing surface of the side slot 380 adjacent the slot end 382. This can be accomplished, for example, by a simple release of the compressive force temporarily applied by the operator using tweezers. In step 1108, the first and second flexure tails (e.g., flexure tails 367 and 368) are electrically connected to the flex cable (e.g., flex cable 62). Methods of electrical connection of the flexure tail to the flex cable may include ultrasonic tab bonding, solder reflow, and solder jet bond (SJB).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A head stack assembly (HSA) comprising:
    an actuator including an actuator body and an actuator arm extending from the actuator body;
    a flex cable attached to the actuator; and
    a first head gimbal assembly (HGA) attached to the actuator arm, the first HGA including
    a load beam,
    a first laminated flexure attached to the load beam, and
    a head attached to the first laminated flexure;
    wherein the first laminated flexure includes a first flexure tail attached to the flex cable, the first flexure tail having a long axis approximately parallel to a side of the actuator arm;
    wherein the actuator arm includes a slot in the side, the slot having a slot end, the first flexure tail being disposed partially within the slot;
    wherein the first flexure tail includes a first raised region in contact with the slot adjacent the slot end, the first raised region including an out-of-plane bend with cross-sectional curvature along the long axis;

wherein the first laminated flexure comprises a stainless steel layer, a dielectric layer, and a conductive layer, and wherein the stainless steel layer is present in the first raised region but the conductive layer is not; and wherein the dielectric layer is also not present in the first raised region.

2. A head stack assembly (HSA) comprising:

an actuator including an actuator body and an actuator arm extending from the actuator body;

a flex cable attached to the actuator; and a first head gimbal assembly (HGA) attached to the actuator arm, the first HGA including a load beam, a first laminated flexure attached to the load beam, and a head attached to the first laminated flexure;

wherein the first laminated flexure includes a first flexure tail attached to the flex cable, the first flexure tail having a long axis approximately parallel to a side of the actuator arm;

wherein the actuator arm includes a slot in the side, the slot having a slot end, the first flexure tail being disposed partially within the slot;

wherein the first flexure tail includes a first raised region in contact with the slot adjacent the slot end, the first raised region including an out-of-plane bend with cross-sectional curvature along the long axis;

wherein the first laminated flexure comprises a stainless steel layer, a dielectric layer, and a conductive layer, and wherein the stainless steel layer is present in the first raised region but the conductive layer is not;

wherein the first raised region defines a first raised region height that exceeds the sum of an average thickness of the dielectric layer and an average thickness of the conductive layer; and wherein the slot defines a slot height, and the slot height is no greater than the sum of an average thickness of the stainless steel layer and the first raised region height.

3. A head stack assembly (HSA) comprising:

an actuator including an actuator body and an actuator arm extending from the actuator body;

a flex cable attached to the actuator; and a first head gimbal assembly (HGA) attached to the actuator arm, the first HGA including a load beam, a first laminated flexure attached to the load beam, and a head attached to the first laminated flexure;

wherein the first laminated flexure includes a first flexure tail attached to the flex cable, the first flexure tail having a long axis approximately parallel to a side of the actuator arm;

wherein the actuator arm includes a slot in the side, the slot having a slot end, the first flexure tail being disposed partially within the slot;

wherein the first flexure tail includes a first raised region in contact with the slot adjacent the slot end, the first raised region including an out-of-plane bend with cross-sectional curvature along the long axis; and wherein the first raised region is disposed partially within the slot.

4. A head stack assembly (HSA) comprising:

an actuator including an actuator body and an actuator arm extending from the actuator body;

a flex cable attached to the actuator; and a first head gimbal assembly (HGA) attached to the actuator arm, the first HGA including a load beam, a first laminated flexure attached to the load beam, and a head attached to the first laminated flexure;

wherein the first laminated flexure includes a first flexure tail attached to the flex cable, the first flexure tail having a long axis approximately parallel to a side of the actuator arm;

wherein the actuator arm includes a slot in the side, the slot having a slot end, the first flexure tail being disposed partially within the slot;

wherein the first flexure tail includes a first raised region in contact with the slot adjacent the slot end, the first raised region including an out-of-plane bend with cross-sectional curvature along the long axis; and wherein the out-of-plane bend is disposed outside the slot.

5. A head stack assembly (HSA) comprising:

an actuator including an actuator body and an actuator arm extending from the actuator body;

a flex cable attached to the actuator; and a first head gimbal assembly (HGA) attached to the actuator arm, the first HGA including a load beam, a first laminated flexure attached to the load beam, and a head attached to the first laminated flexure;

wherein the first laminated flexure includes a first flexure tail attached to the flex cable, the first flexure tail having a long axis approximately parallel to a side of the actuator arm;

wherein the actuator arm includes a slot in the side, the slot having a slot end, the first flexure tail being disposed partially within the slot;

wherein the first flexure tail includes a first raised region in contact with the slot adjacent the slot end, the first raised region including an out-of-plane bend with cross-sectional curvature along the long axis; and further comprising a second HGA attached to the actuator arm, the second HGA including a second laminated flexure having a second flexure tail attached to the flex cable, wherein the second flexure tail is disposed partially within the slot, and the second flexure tail includes a second raised region that is in contact with the slot adjacent the slot end;

wherein a stainless steel layer of the first flexure tail is in contact with the second flexure tail at a tail-to-tail contact location that lies outside the first raised region, and the stainless steel layer of the first flexure tail at a location within the first raised region is in contact with the slot adjacent the slot end.

6. The HSA of claim 5 wherein the first raised region defines a first raised region height, the second raised region defines a second raised region height, and the slot defines a slot height, and wherein the slot height is no greater than the sum of the first raised region height, the second raised region height, and twice an average thickness of the stainless steel layer.

7. A head stack assembly (HSA) comprising:

an actuator including an actuator body and an actuator arm extending from the actuator body;

a flex cable attached to the actuator; and a first head gimbal assembly (HGA) attached to the actuator arm, the first HGA including a load beam, a first laminated flexure attached to the load beam, and a head attached to the first laminated flexure;

wherein the first laminated flexure includes a first flexure tail attached to the flex cable, the first flexure tail having a long axis approximately parallel to a side of the actuator arm;

wherein the actuator arm includes a slot in the side, the slot having a slot end, the first flexure tail being disposed partially within the slot;

wherein the first flexure tail includes a first raised region in contact with the slot adjacent the slot end, the first raised region including an out-of-plane bend with cross-sectional curvature along the long axis; and wherein the raised region is hemispherical.

* * * * *